United States Patent
Solis et al.

(10) Patent No.: US 9,467,377 B2
(45) Date of Patent: Oct. 11, 2016

(54) ASSOCIATING CONSUMER STATES WITH INTERESTS IN A CONTENT-CENTRIC NETWORK

(71) Applicant: Palo Alto Research Center Incorporated, Palo Alto, CA (US)

(72) Inventors: Ignacio Solis, South San Francisco, CA (US); Matthias Herlich, Padernborn (DE)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 72 days.

(21) Appl. No.: 14/309,677

(22) Filed: Jun. 19, 2014

(65) Prior Publication Data
US 2015/0372914 A1    Dec. 24, 2015

(51) Int. Cl.
G06F 15/16 (2006.01)
H04L 12/741 (2013.01)
G06Q 10/06 (2012.01)
H04L 29/08 (2006.01)

(52) U.S. Cl.
CPC ............. H04L 45/745 (2013.01); G06Q 10/06 (2013.01); H04L 67/16 (2013.01)

(58) Field of Classification Search
CPC .............................. H04L 67/10; H04L 45/745
USPC ........................................ 709/202, 203, 206
See application file for complete search history.

(56) References Cited

U.S. PATENT DOCUMENTS

| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009}.

(Continued)

*Primary Examiner* — Duyen Doan
(74) *Attorney, Agent, or Firm* — Shun Yao; Park, Vaughan, Fleming & Dowler LLP

(57) ABSTRACT

One embodiment provides a system that facilitates associating consumer states with interests in a Content-Centric Network (CCN). During operation, the system generates an interest for a content object comprising a name of the content object in a remote node. The name in the interest is location independent and uniquely identifies the content object in the CCN. The interest is routed in the CCN based on the name. The system also associates the consumer states, which are associated with the content object, with the interest.

15 Claims, 15 Drawing Sheets

(56) References Cited

U.S. PATENT DOCUMENTS

| | | |
|---|---|---|
| 6,233,646 B1 | 5/2001 | Hahm |
| 6,332,158 B1 | 12/2001 | Risley |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,772,333 B1 | 8/2004 | Brendel |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,257,837 B2 | 8/2007 | Xu |
| 7,287,275 B2 | 10/2007 | Moskowitz |
| 7,315,541 B1 | 1/2008 | Housel |
| 7,350,229 B1 | 3/2008 | Lander |
| 7,382,787 B1 | 6/2008 | Barnes |
| 7,444,251 B2 | 10/2008 | Nikovski |
| 7,496,668 B2 | 2/2009 | Hawkinson |
| 7,509,425 B1 | 3/2009 | Rosenberg |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 | 1/2010 | Feng |
| 7,685,290 B2 | 3/2010 | Satapati |
| 7,698,463 B2 | 4/2010 | Ogier |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,979,912 B1 * | 7/2011 | Roka ............... G06F 21/34 726/28 |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,224,985 B2 | 7/2012 | Takeda |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,665,757 B2 | 3/2014 | Kling |
| 8,667,172 B2 | 3/2014 | Ravindran |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,817,594 B2 | 8/2014 | Gero |
| 8,826,381 B2 | 9/2014 | Kim |
| 2002/0010795 A1 | 1/2002 | Brown |
| 2002/0048269 A1 | 4/2002 | Hong |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0199014 A1 | 12/2002 | Yang |
| 2003/0046437 A1 | 3/2003 | Eytchison |
| 2003/0051100 A1 | 3/2003 | Patel |
| 2003/0074472 A1 | 4/2003 | Lucco |
| 2003/0140257 A1 | 7/2003 | Peterka |
| 2004/0024879 A1 | 2/2004 | Dingman |
| 2004/0030602 A1 | 2/2004 | Rosenquist |
| 2004/0139230 A1 | 7/2004 | Kim |
| 2004/0221047 A1 | 11/2004 | Grover |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0051055 A1 | 3/2006 | Ohkawa |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2008/0005056 A1 | 1/2008 | Stelzig |
| 2008/0010366 A1 | 1/2008 | Duggan |
| 2008/0046340 A1 | 2/2008 | Brown |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133755 A1 | 6/2008 | Pollack |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0270618 A1 | 10/2008 | Rosenberg |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0077184 A1 | 3/2009 | Brewer |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0228593 A1 | 9/2009 | Takeda |
| 2009/0268905 A1 | 10/2009 | Matsushima |
| 2009/0287835 A1 | 11/2009 | Jacobson |
| 2009/0288163 A1 | 11/2009 | Jacobson |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0046546 A1 | 2/2010 | Ram |
| 2010/0057929 A1 | 3/2010 | Merat |
| 2010/0088370 A1 | 4/2010 | Wu |
| 2010/0098093 A1 | 4/2010 | Ejzak |
| 2010/0103870 A1 | 4/2010 | Garcia-Luna-Aceves |
| 2010/0124191 A1 | 5/2010 | Vos |
| 2010/0131660 A1 | 5/2010 | Dec |
| 2010/0169503 A1 | 7/2010 | Kollmansberger |
| 2010/0180332 A1 | 7/2010 | Ben-Yochanan |

(56) References Cited

U.S. PATENT DOCUMENTS

| | | |
|---|---|---|
| 2010/0182995 A1 | 7/2010 | Hwang |
| 2010/0195653 A1* | 8/2010 | Jacobson ............... H04L 45/00 370/392 |
| 2010/0195654 A1 | 8/2010 | Jacobson |
| 2010/0195655 A1 | 8/2010 | Jacobson |
| 2010/0232402 A1 | 9/2010 | Przybysz |
| 2010/0232439 A1 | 9/2010 | Dham |
| 2010/0235516 A1 | 9/2010 | Nakamura |
| 2010/0250939 A1 | 9/2010 | Adams |
| 2010/0268782 A1 | 10/2010 | Zombek |
| 2010/0284309 A1 | 11/2010 | Allan |
| 2010/0284404 A1 | 11/2010 | Gopinath |
| 2011/0022812 A1 | 1/2011 | vanderLinden |
| 2011/0055392 A1 | 3/2011 | Shen |
| 2011/0090908 A1 | 4/2011 | Jacobson |
| 2011/0106755 A1 | 5/2011 | Hao |
| 2011/0137746 A1* | 6/2011 | Takahashi ............... G06F 21/10 705/26.25 |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0271007 A1 | 11/2011 | Wang |
| 2011/0286457 A1 | 11/2011 | Ee |
| 2011/0286459 A1 | 11/2011 | Rembarz |
| 2011/0299454 A1 | 12/2011 | Krishnaswamy |
| 2012/0011551 A1 | 1/2012 | Levy |
| 2012/0036180 A1 | 2/2012 | Thornton |
| 2012/0066727 A1 | 3/2012 | Nozoe |
| 2012/0114313 A1 | 5/2012 | Phillips |
| 2012/0120803 A1 | 5/2012 | Farkas |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0179653 A1 | 7/2012 | Araki |
| 2012/0221150 A1 | 8/2012 | Arensmeier |
| 2012/0224487 A1 | 9/2012 | Hui |
| 2012/0290669 A1 | 11/2012 | Parks |
| 2012/0290919 A1 | 11/2012 | Melnyk |
| 2012/0291102 A1 | 11/2012 | Cohen |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0219081 A1 | 8/2013 | Qian |
| 2013/0223237 A1 | 8/2013 | Hui |
| 2013/0242996 A1 | 9/2013 | Varvello |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0082135 A1 | 3/2014 | Jung |
| 2014/0089454 A1 | 3/2014 | Jeon |
| 2014/0129736 A1 | 5/2014 | Yu |
| 2014/0172981 A1 | 6/2014 | Kim |
| 2014/0173034 A1 | 6/2014 | Liu |
| 2014/0181226 A1* | 6/2014 | Xu ............... H04L 51/14 709/206 |
| 2014/0195328 A1 | 7/2014 | Ferens |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0282816 A1 | 9/2014 | Xie |
| 2014/0289325 A1 | 9/2014 | Solis |
| 2014/0289790 A1 | 9/2014 | Wilson |

FOREIGN PATENT DOCUMENTS

| | | |
|---|---|---|
| EP | 0295727 A2 | 12/1988 |
| EP | 0757065 A2 | 7/1996 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

B. Lynn. The Pairing-Based Cryptography Library, http://crypto.stanford.edu/pbc/.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.

D. Boneh and M. Franklin. Identity-Based Encryption from the Weil Pairing. Advances in Cryptology—CRYPTO 2001, vol. 2139, Springer Berlin Heidelberg (2001).

G. Ateniese, K. Fu, M. Green, and S. Hohenberger. Improved Proxy Reencryption Schemes with Applications to Secure Distributed Storage. In the 12th Annual Network and Distributed System Security Symposium (2005).

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer ScienceVolume 5443 (2009).

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

(56) References Cited

OTHER PUBLICATIONS

Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Miniconference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.

(56) References Cited

OTHER PUBLICATIONS

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012}.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

Koponen, Teemu et al., "A Data-Oriented (and Beyond) Network Architecture", SIGCOMM '07, Aug. 27-31, 2007, Kyoto, Japan, XP-002579021, p. 181-192.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, a. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matted Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Scalable and Adaptive Internet Solutions (SAIL) Project [online], http://sail-project.eu/ project.eu/ Downloaded Mar. 9, 2015.

(56) References Cited

OTHER PUBLICATIONS

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based Pomdp solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, a. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.

* cited by examiner

US 9,467,377 B2

ASSOCIATING CONSUMER STATES WITH INTERESTS IN A CONTENT-CENTRIC NETWORK

BACKGROUND

1. Field

This disclosure is generally related to object interests. More specifically, this disclosure is related to expressing an interest with state information based on network names.

2. Related Art

In many computing applications, it is often important for devices in a network to express interests for their respective collections of data. The proliferation of digital content creates a vast number of collections, which require reconciliation. Content-Centric Network (CCN) architectures have been designed to facilitate accessing such digital content. These networks include entities, or nodes, such as network clients, forwarders (e.g., routers and switches), and content producers, which communicate with each other by sending "interest" packets for various content items and receiving "response" packets comprising content objects in return. Unlike a traditional Internet Protocol (IP) network, where an object is tied to its location and its IP address, the content objects in a CCN are identified based on a specific name, which is location independent.

For example, a border router that is connected to multiple areas of a computer network can subscribe to namespaces for those areas (e.g., "Area 1" and "Area 2"). Other routers that are not border routers may only subscribe to a single area. This way, a router that subscribes to the namespace "Area 1" only obtains network-configuration items for Area 1, and a router that subscribes to the namespace "Area 2" only obtains network-configuration items for Area 2. The border router that subscribes to both namespaces can obtain network-configuration items for Area 1 and Area 2.

Because a network-configuration item's structured name is unique and persistent, a node in a CCN can generate a hash value for each network-configuration item based on the structured name, without having to process the data for each content item. The node can also generate an additive hash for each routing-data collection, based on the hashes for the individual network-configuration items of a routing-data collection, so that the additive hash represents the contents of the routing-data collection. For example, the node can generate the additive hash by using an addition operation (or some other mathematical function) to process the hashes for the individual network-configuration items of the routing-data collection.

In a CCN, a node requests an object using an interest based on the persistent name of the object. A node requesting the object can be referred to as a consumer. Any producer node of the object sends back the object using a response. Some content can be associated with states of the consumer, which can be referred to as consumer states. For example, accessing a video file content object can require consumer states comprising a username and password. Hence, an interest for the video file should incorporate the consumer states. Though CCN brings many desirable features to a network, some issues remain unsolved for providing consumer states with interests for associated content objects.

SUMMARY

One embodiment provides a system that facilitates associating consumer states with interests in a Content-Centric Network (CCN). During operation, the system generates an interest for a content object comprising a name of the content object in a remote node. The name in the interest is location independent and uniquely identifies the content object in the CCN. The interest is routed in the CCN based on the name. The system also associates the consumer states, which are associated with the content object, with the interest.

In a variation on this embodiment, the system generates the consumer states and a state identifier for the consumer states.

In a further variation, the system creates a state content object of the consumer states and associates the state identifier with the state content object.

In a further variation, the system associates the state identifier with the state content object based on one or more of: embedding the consumer states in the interest, embedding the state content object in the interest, encoding the state identifier in the interest, encoding the name of a state content object in the interest, encoding the consumer state identifier in the interest name, and encoding the state content object in the interest name.

In a further variation, the system caches the consumer states.

In a further variation, the system generates the consumer states based on: calculating a difference between new consumer states and the consumer states, including the difference in the interest and one or more of: the state identifier of the consumer states, an identifier of the new consumer states, and an identifier of the difference.

BRIEF DESCRIPTION OF THE FIGURES

In the figures, like reference numerals refer to the same figure elements.

DETAILED DESCRIPTION

Figure 1:
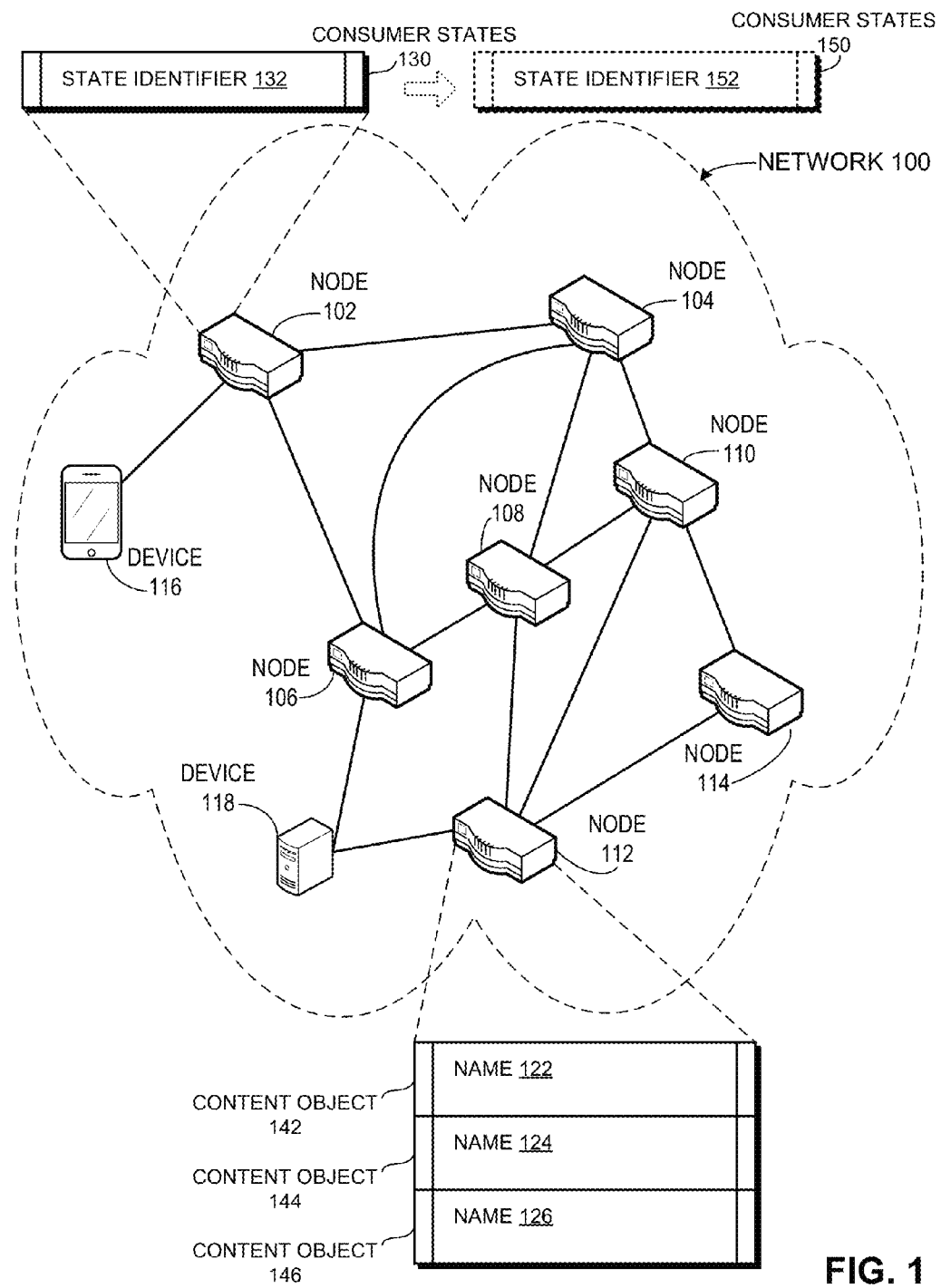
FIG. 1 illustrates an exemplary Content-Centric Network (CCN) with state-associated interest support, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of incorporating consumer states into interests for content objects is solved by integrating the states and/or their identifiers into the corresponding interest. In a Content-Centric Network (CCN), a consumer node can obtain a content object (CO) (i.e., a new content item), or an object, at any time by broadcasting an interest packet comprising the persistent name of the object. This interest packet can be referred to as an interest. In this disclosure, the terms "content object" and "object" are used interchangeably. Any producer node (e.g., a server) hosting the content object can respond to that interest and send a response packet comprising the content object to the consumer node. This response packet can be referred to as a response. Some content objects can be associated with consumer states. For example, if the content object is an email from a web-mail service, the consumer states can be the username and password of a valid subscriber. In another example, if the content object is a data file requiring backing up, the consumer states can be the time window when the file should be backed up.

Furthermore, a consumer node may send multiple interests to obtain related content objects associated with the same states. For example, the consumer node can send multiple interests to obtain an e-mail and its attachments from a producer, each of which is associated with the username and password. However, because such a content object can be served from any producer node in the CCN, the interest for the email and the interest for an attachment can go to different producers. When a producer node already has the consumer states in its local cache, the producer node does not need the consumer states in the subsequent interests. On the other hand, if a different producer node responds to the subsequent interest, this different producer needs the consumer states to respond. Consequently, distribution of interest for content objects associated with consumer states can become inefficient in a CCN.

To solve this problem, embodiments of the present invention facilitate a consumer node to associate consumer states with an interest for a content object. In this way, a producer node becomes aware of the consumer states upon receiving the interest and can act accordingly. In some embodiments, the consumer node integrates the consumer states into the interest. The consumer node can include the consumer states as part of the network name in the interest. As a result, whichever producer node receives the interest can have the consumer states. However, if the consumer states are large, they may not be suitable for integration with the interest. Furthermore, even if the producer node already has the consumer states in its local cache, the producer node still receives the consumer states.

In some embodiments, the consumer node creates the consumer states and assigns a state identifier, which can be a network name, to the consumer states, and includes the state identifier in the interest. Upon receiving the interest, the producer node generates an interest based on the state identifier and obtains the consumer states. The state identifier can be small compared to the consumer states. If the producer node already has the consumer states, the producer node does not need to obtain the consumer states. If the consumer states are updated and a new corresponding state identifier is generated, the consumer node includes the new state identifier in a subsequent interest. The producer node then obtains the updated consumer states. However, this may lead to additional round trip time.

In some embodiments, when consumer states are updated, the consumer node includes the identifier of the previous consumer states, which has a higher probability of being cached at a producer node, and the difference between the corresponding previous consumer states and the updated consumer states. Because this difference is typically small, such a difference can be integrated in a subsequent interest. Upon receiving the interest, the producer node extracts the difference from the interest, identifies the cached consumer states based on the state identifier, and updates the cached consumer states based on the difference. In this way, the producer node can update the consumer states without obtaining the updated consumer states from the consumer node, thereby saving the round trip time.

In some embodiments, the network clients, network nodes (e.g., forwarders such as routers), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independently from the data's storage location, network location, application, and means of transportation. In other words, the name can be used to route the interest and the data in ICN. Named-Data Network (NDN)

or a CCN are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the content object's data (e.g., a checksum value) and/or from elements of the content object's name. A hash-based name is described in U.S. patent application Ser. No. 13/847,814, titled "Ordered-Element Naming for Name-Based Packet Forwarding," by inventor Ignacio Solis, filed 20 Mar. 2013, the disclosure of which is incorporated by reference herein. A name can also be a flat label. Hereinafter, "name" is used to refer to any name for a piece of data in an NDN, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or interest across an information-centric network, which CCN/NDN routers can propagate toward a storage device (e.g., a cache server) or a data producer that can provide the requested data to satisfy the request or interest.

In some embodiments, the ICN system can include a CCN architecture. However, the methods disclosed herein are also applicable to other ICN architectures as well. A CCN architecture is described in U.S. patent application Ser. No. 12/338,175, titled "Controlling the Spread of Interests and Content in a Content Centric Network," by inventors Van L. Jacobson and *Diana* K. Smetters, filed 18 Dec. 2008, the disclosure of which is incorporated by reference herein.

In this disclosure, the term "consumer states" is used in a generic sense. Any information which is associated with a consumer can be referred to as "consumer states." Examples of consumer states include, but are not limited to, consumer information related to authentication, control, policy, and network.

Network Architecture

FIG. 1 illustrates an exemplary CCN with state-associated interest support, in accordance with an embodiment of the present invention. Network 100 includes nodes 102, 104, 106, 108, 110, 112, and 114. These nodes can be CCN routers or other forwarders, and consumer and/or producer nodes. For example, node 112 can be coupled to a device 118 and operate as a producer node for content objects 142, 144, and 146, which are associated with network names 122, 124, and 126, respectively. On the other hand, node 102 can be coupled to a client device 116 and operate as a consumer node with consumer states 130, which can be associated with a state identifier 132. Consumer node 102 can create consumer states 130, creates state identifier 132, and assigns state identifier 132 to consumer states 130. In some embodiments, consumer node 102 creates a state content object (e.g., by signing consumer states 130 with a key of consumer node 102) of consumer states 130. Consumer node 102 associates state identifier 132 with the state content object. In some embodiments, consumer node 102 creates a network name (e.g., a routable name, such as an HSVLI) for the state content object based on state identifier 132.

During operation, consumer node 102 generates an interest for content object 142 based on name 122. This interest is disseminated in network 100 and reaches producer node 112. Node 112 determines that it hosts content object 142 and sends a response comprising content object 142 back to consumer node 102. Consumer node 102 also generates an interest for content objects 144 and 146 based on names 124 and 126, respectively. However, content objects 142, 144, and 146 can be associated with consumer states 130. For example, content objects 142, 144, and 146 represent an email and its attachments, while consumer states 130 can be the username and password.

Furthermore, consumer node 102 sends multiple interests to obtain these related content objects associated with consumer states 130. Suppose that node 106 is also a producer node for content objects 142, 144, and 146. As a result, content objects 142, 144, and 146 can be served from producer node 112 or 106, and the interest for the email and the interest for an attachment can go to different producers. Furthermore, if producer node 112 has received consumer states 130, producer node 112 does not need consumer states 130 in subsequent interests. On the other hand, when producer node 106 responds to the subsequent interests, producer node 106 needs consumer states 130.

To solve this problem, consumer node 102 associates consumer states 130 with the interest for content objects 142, 144, and 146. In this way, producer node 112 or 106 becomes aware of the consumer states 130 upon receiving the interest and can act accordingly. In some embodiments, consumer node 102 embeds consumer states 130 into the interest. Furthermore, consumer node can also embed the state content object of consumer states 130 in the interest. Consumer node 102 can embed consumer states 130 (and/or the corresponding state content object) as part of the network name. For example, for an interest for content object 142, the interest includes a network name which includes name 122 as well as consumer states 130 (and/or the corresponding state content object). As a result, whichever producer node (e.g., producer node 106 or 112) receives the interest can receive consumer states 130 as part of the network name in the interest. However, if consumer states 130 are large, they may not be suitable for integration with the interest.

In some embodiments, consumer node 102 assigns a state identifier 132 to consumer states 130. Consumer node 102 can generate a network name based on the state identifier 132, and includes state identifier 132 (and/or the corresponding network name) in the interest. Upon receiving the interest, producer node 112 generates an interest based on state identifier 132. Upon receiving that interest, consumer node 102 send the state content object of consumer states 130 to producer node 112. State identifier 132 can be small compared to consumer states 130 and its state content object. If producer node 112 already has consumer states 130, producer node 112 does not need to obtain consumer states 130. If consumer states 130 are updated to consumer states 150 (denoted with dotted lines) (e.g., due to a password change or a new item in a shopping cart), and consumer node 102 generates a new corresponding state identifier 152, consumer node 102 includes state identifier 152 in a subsequent interest. Producer node 112 then obtains updated consumer states 150 based on state identifier 152. However, this may lead to additional round trip time.

In some embodiments, when consumer states 130 are updated, consumer node 102 includes an identifier of the previous consumer states (i.e., state identifier 132). Because node 102 has already disseminated state identifier 132, consumer states 130 have a higher probability of being cached at a producer node compared to consumer states 150. Consumer node 102 also includes the difference between previous consumer states 130 and updated consumer states 150. Because this difference is typically small, such a difference can be integrated in a subsequent interest. Upon receiving the interest, producer node 112 extracts the difference from the interest, identifies cached consumer states 130 based on state identifier 132, and updates cached consumer states 130 to consumer states 150 based on the difference. In this way, producer node 112 can update locally cached consumer states 130 without obtaining updated consumer states 150 from consumer node 102, thereby saving the round trip time.

Integrated Consumer States

Figure 2A:
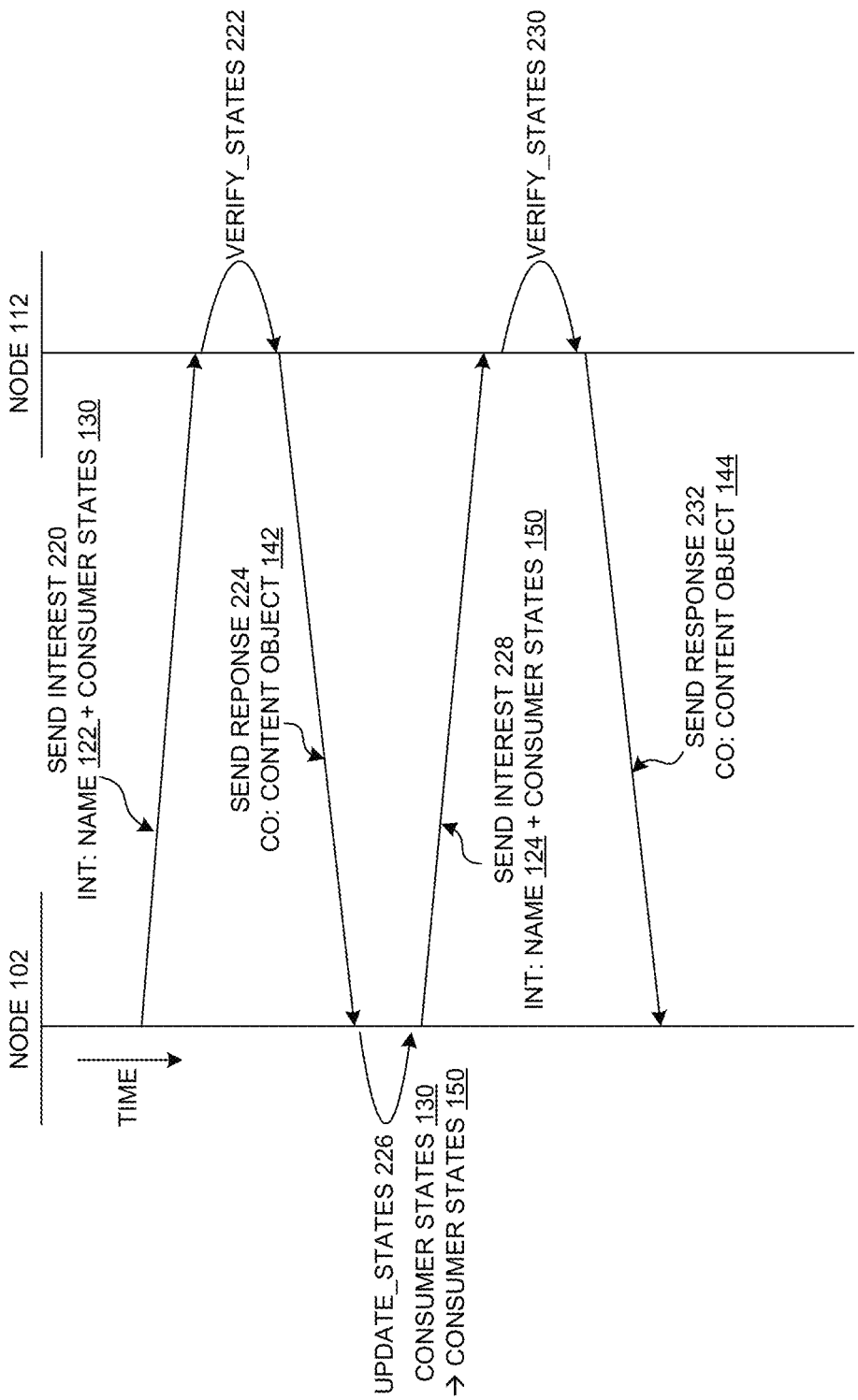
FIG. 2A illustrates an exemplary communication in a CCN with state-associated interest support based on integrated consumer states, in accordance with an embodiment of the present invention.

FIG. 2A illustrates an exemplary communication in a CCN with state-associated interest support based on integrated consumer states, in accordance with an embodiment of the present invention. During operation, consumer node 102 in CCN 100 sends an initial interest 220 comprising a name 122 associated with content object 142 and consumer states 130. As interest 220 moves through CCN 100 from consumer node 102, producer node 112 receives interest 220 and, based on name 122 in interest 220, determines that producer node 112 hosts content object 142. Producer node 112 extracts consumer states 130 from interest 220 and performs procedure verify_states 222. For example, if interest 220 is for a video file (i.e., content object 142 is a video file), consumer states 130 can carry the username and password. Producer node 112 can locally cache consumer states 130. Procedure 222 then verifies whether the username and password correspond to a valid subscriber of content object 142. In other words, the verification procedure can include the caching of consumer states. In some embodiments, the verification procedure includes authentication of the consumer node.

Upon verification, producer node 112 sends a response message 224 comprising content object 142. Suppose that consumer node 102 performs procedure update_states 226 and updates consumer states 130 (e.g., updates the password) to consumer states 150, as described in conjunction with FIG. 1. Then, consumer node 102 sends another interest 228 comprising a name 124 associated with content object 144 (which can be another video file) and updated consumer states 150. Producer node 112 receives interest 228 and determines that producer node 112 hosts content object 144. Producer node 112 extracts consumer states 150 and performs procedure verify_states 230. In this state, producer node 112 verifies consumer states 150. Upon verification of consumer states 150, producer node 112 locally caches consumer states 150 and sends a response message 232 comprising content object 144.

Figure 2B:
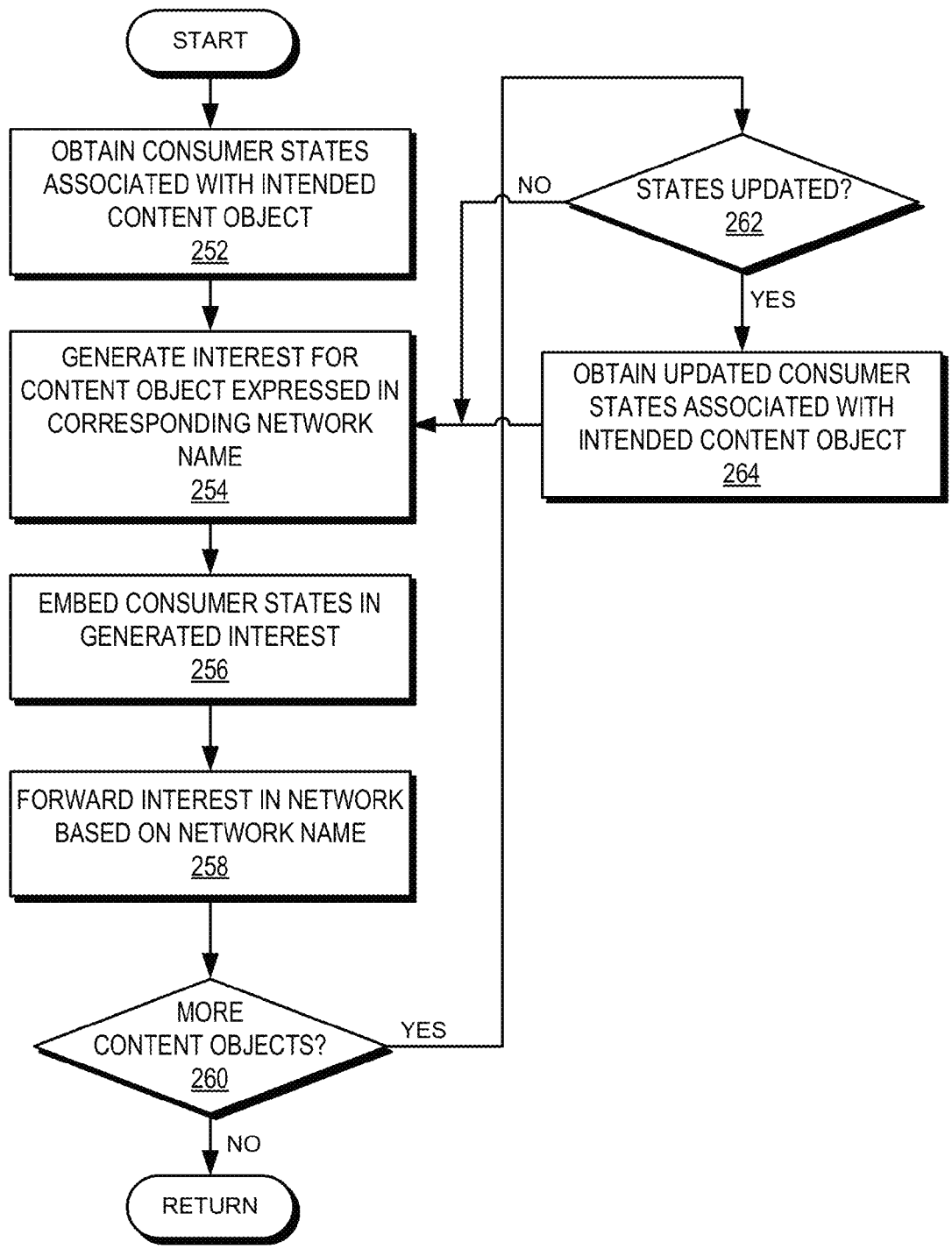
FIG. 2B presents a flowchart illustrating the process of a consumer node expressing interests with integrated consumer states, in accordance with an embodiment of the present invention.

FIG. 2B presents a flowchart illustrating the process of a consumer node expressing interests with integrated consumer states, in accordance with an embodiment of the present invention. During operation, the node obtains consumer states associated with an intended content object (operation 252). The node generates an interest for content object expressed in a corresponding network name (operation 254) and embeds the consumer states in the generated interest (operation 256). In some embodiments, the node includes the consumer states as part of the network name. The node forwards the interest based on the network name (operation 258).

The node checks whether more content objects are associated with the obtained consumer states (operation 260). If so, the node checks whether the consumer states have been updated (operation 262), as described in conjunction with FIG. 2A. If the consumer states have not been updated, the node continues to generate interest for the next content object expressed in a corresponding network name (operation 254). If the consumer states have been updated, the node obtains updated consumer, states which are also associated with the next content object (operation 264) and continues to generate interest for the content object expressed in a corresponding network name (operation 254).

Figure 2C:
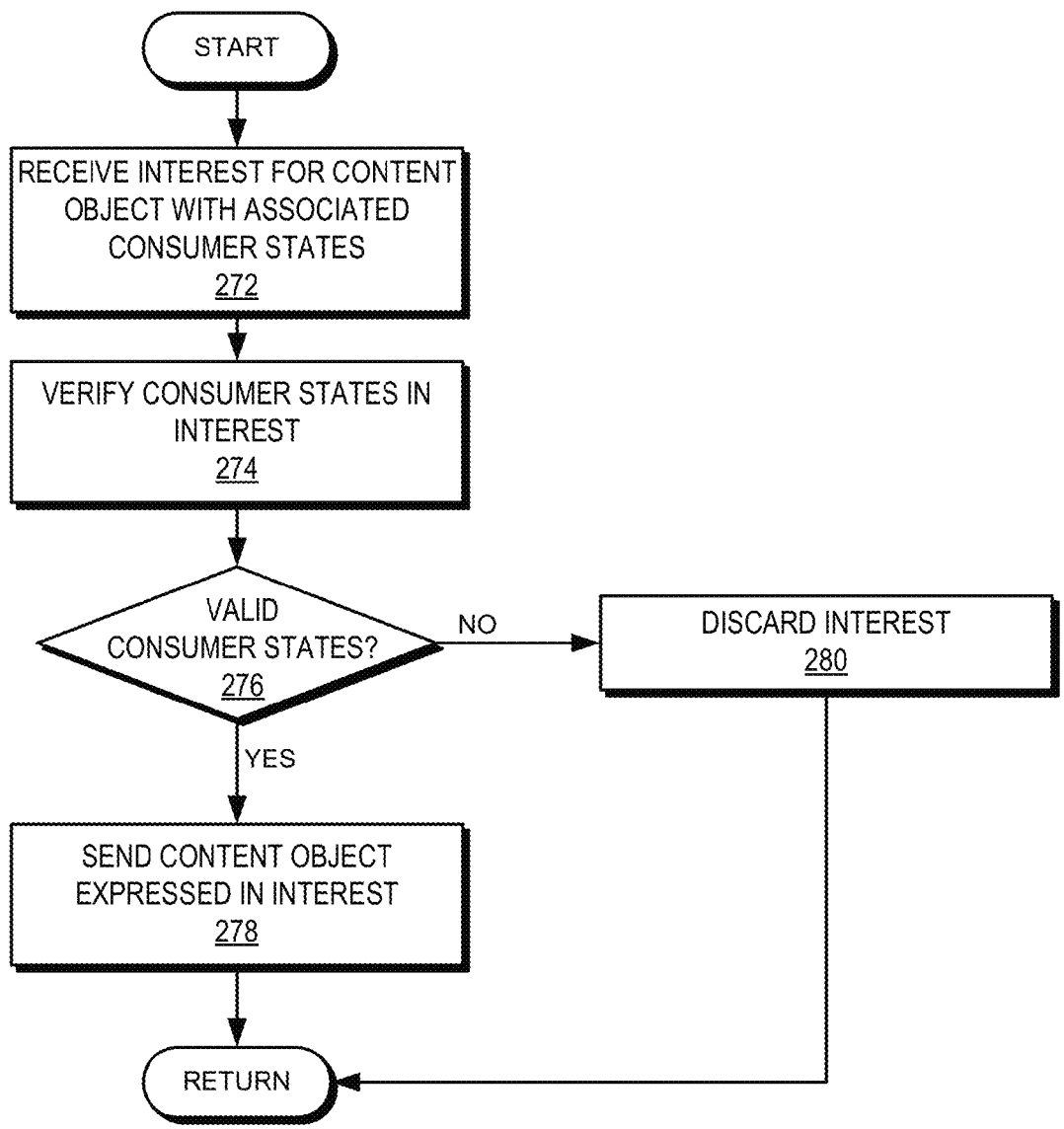
FIG. 2C presents a flowchart illustrating the process of a producer node responding to interests with integrated consumer states, in accordance with an embodiment of the present invention.

FIG. 2C presents a flowchart illustrating the process of a producer node responding to interests with integrated consumer states, in accordance with an embodiment of the present invention. During operation, the node receives an interest for a content object with associated consumer states (operation 272) and verifies the consumer states in the interest (operation 274). The node checks whether the consumer states are valid (operation 276), as described in conjunction with FIG. 2A. If the consumer states are valid, the node sends the content object expressed in interest (operation 278). Otherwise, the node discards the interest (operation 280).

Integrated Consumer States with State Identifiers

Figure 3A:
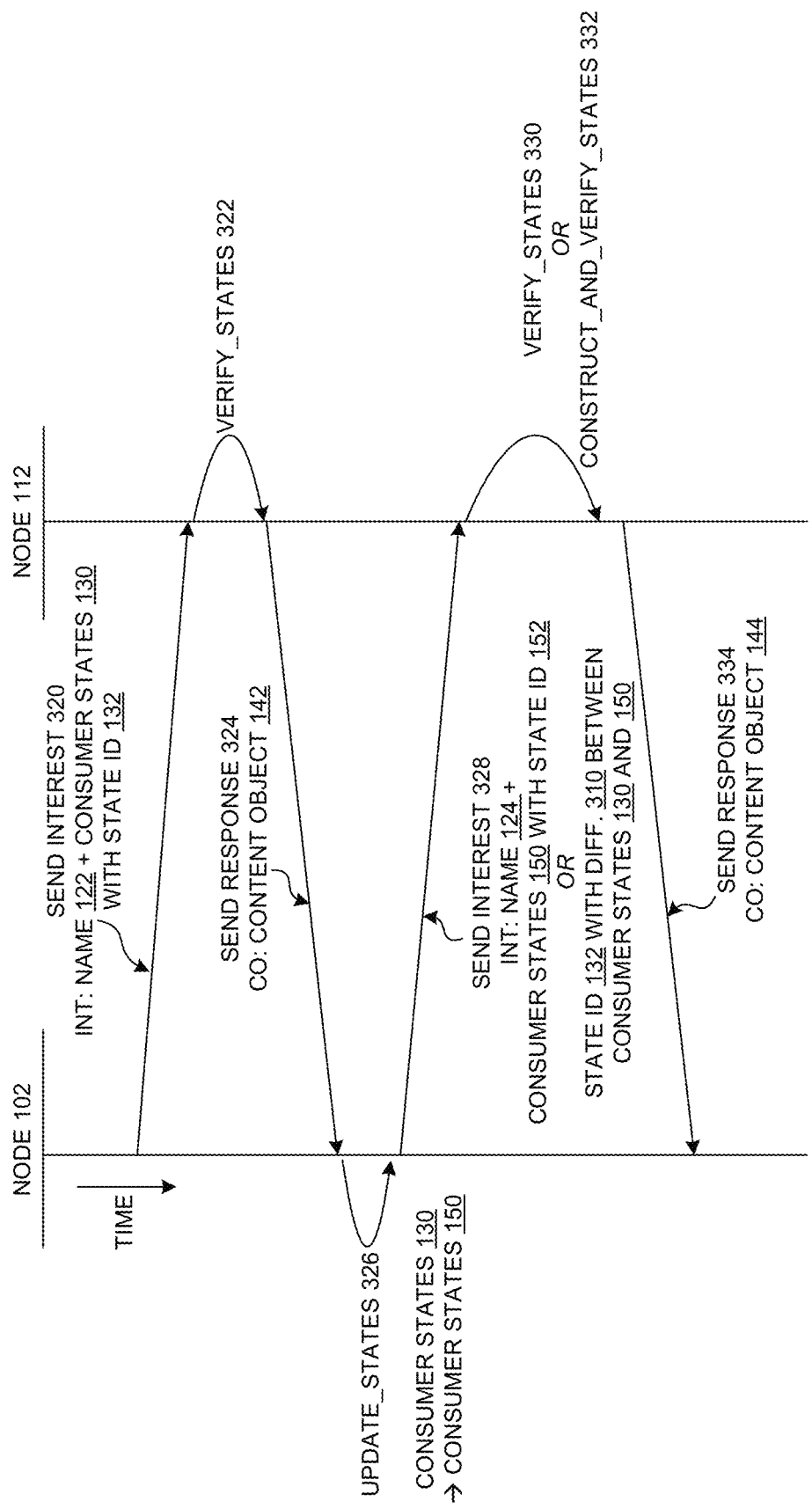
FIG. 3A illustrates an exemplary communication in a CCN with state-associated interest support based on integrated consumer states and associated state identifiers, in accordance with an embodiment of the present invention.

In some embodiments, a consumer node can generate a state identifier for consumer states. This state identifier can be part of the network name in the interest. FIG. 3A illustrates an exemplary communication in a CCN with state-associated interest support based on integrated consumer states and associated state identifiers, in accordance with an embodiment of the present invention. During operation, consumer node 102 in CCN 100 sends an initial interest 320 comprising a name 122 associated with content object 142 and consumer states 130 with its state identifier 132. In some embodiments, state identifier 132 is embedded in interest 320 as a routable network name of state identifier 132.

As interest 320 moves through CCN 100 from consumer node 102, producer node 112 receives interest 320 and determines that producer node 112 hosts content object 142 based on name 122 in interest 320. Producer node 112 extracts consumer states 130 and state identifier 132 from interest 320, and performs procedure verify_states 322. In some embodiments, producer node 112 derives state identifier 132 from its network name embedded in interest 320. For example, if interest 320 is for a video file (i.e., content object 142 is a video file), consumer states 130 can carry the username and password. Producer node 112 can locally cache consumer states 130. Procedure 322 then verifies whether the username and password correspond to a valid subscriber of content object 142. In other words, the verification procedure can include the caching of consumer states. In some embodiments, the verification procedure includes authentication of the consumer node.

Upon verification, producer node 112 sends a response message 324 comprising content object 142. Suppose that consumer node 102 performs procedure update_states 326 and updates consumer states 130 (e.g., updates the password) to consumer 150, as described in conjunction with FIG. 1. Then, consumer node 102 sends another interest 328 comprising a name 124 associated with content object 144 (which can be another video file) and updated consumer states 150 with its state identifier 152. In some embodiments, state identifier 152 is embedded in interest 328 as a network name of state identifier 152. Producer node 112 receives interest 328, locally caches consumer states 150, and performs procedure verify_states 330. In some embodiments, producer node 112 derives state identifier 152 from its network name embedded in interest 328. In this state, producer node 112 verifies consumer states 150. Upon verification of consumer states 150, producer node 112 sends a response message 334 comprising content object 144.

However, if consumer states 150 are unsuitable (e.g., too large) to fit in interest 328, consumer node 102 includes a name 124, state identifier 132 of previous consumer states 130, and a difference 310 between consumer states 130 and 150 in interest 328. In some embodiments, consumer node 102 assigns an identifier to difference 310 and includes the identifier of the difference in interest 328. State identifier 132 can be embedded in interest 328 as the network name of state identifier 132. Difference 310 can be small compared to consumer states 150 and can be more suitable to fit in interest 328 than consumer states 150. Producer node 112 receives interest 328, and determines that producer node 112 hosts content object 144. Producer node 112 extracts consumer identifier 132 and difference 310, and determines that consumer states 130 are locally cached and have been updated at consumer node 102. In some embodiments, producer node 112 derives state identifier 132 from its network name embedded in interest 328. Producer node 112 integrates difference 310 into cached consumer states 130 to perform procedure construct_and_verify_states 332 to construct and verify consumer states 150. Upon verification of consumer states 150, producer node 112 sends a response message 334 comprising content object 144.

Figure 3B:
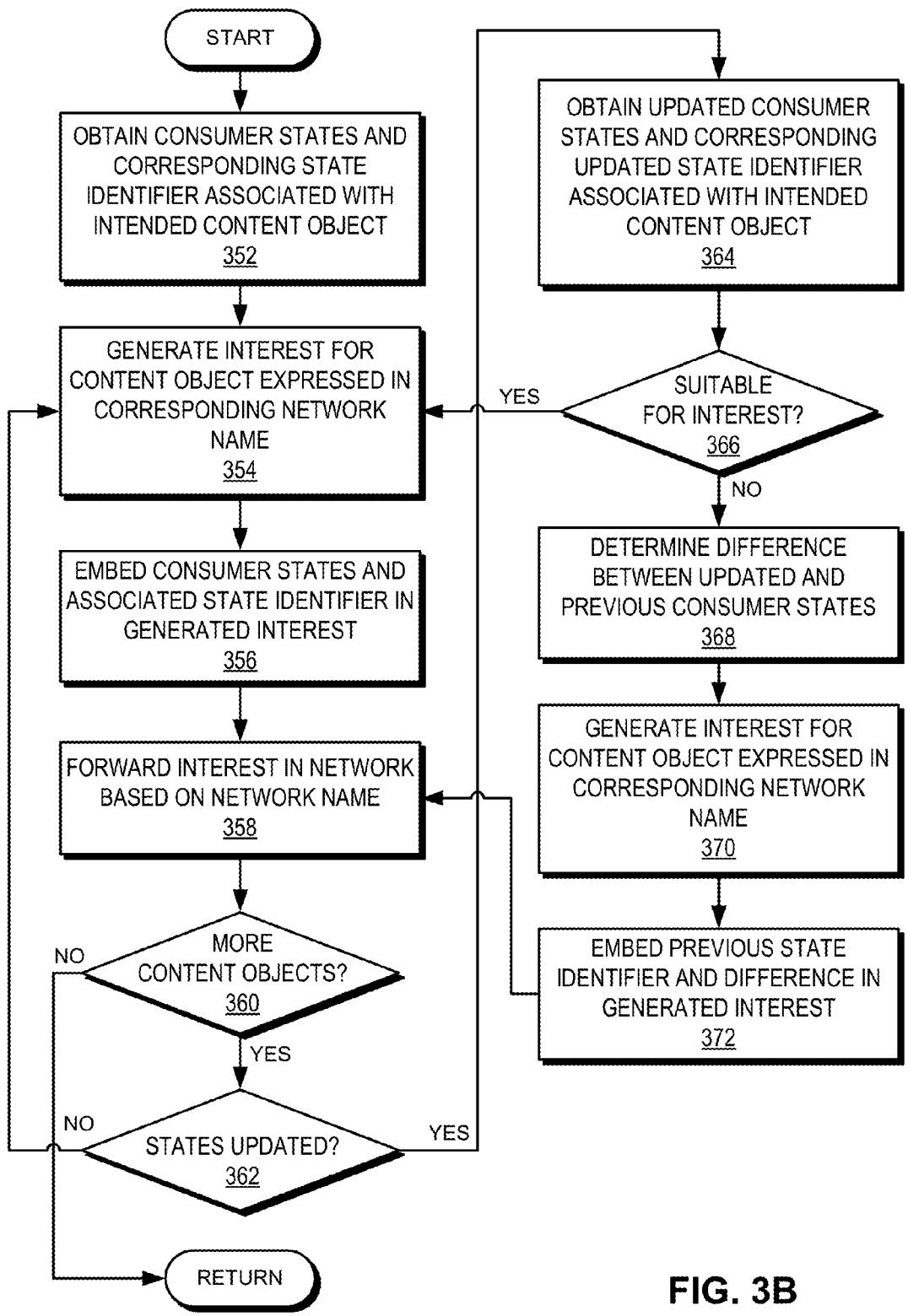
FIG. 3B presents a flowchart illustrating the process of a consumer node expressing interests with integrated consumer states and associated state identifiers, in accordance with an embodiment of the present invention.

FIG. 3B presents a flowchart illustrating the process of a consumer node expressing interests with integrated consumer states and associated state identifiers, in accordance with an embodiment of the present invention. During operation, the node obtains the consumer states associated with an intended content object (operation 352). The node generates an interest for the content object expressed in a corresponding network name (operation 354) and embeds the consumer states and the associated state identifier in the generated interest (operation 356). In some embodiments, the state identifier is embedded in the interest as a network name of the state identifier. The node can also embed the consumer states as part of the network name. The node forwards the interest based on the network name (operation 358).

The node checks whether more content objects are associated with the obtained consumer states (operation 360). If so, the node checks whether the consumer states have been updated (operation 362), as described in conjunction with FIG. 3A. If the consumer states have not been updated, the node continues to generate interest for the next content object expressed in a corresponding network name (operation 354). If the consumer states have been updated, the node obtains updated consumer states, which are also associated with the next content object, and the corresponding updated state identifier (operation 364) and checks whether the updated content object is suitable for an interest (e.g., fits in the interest) (operation 366).

If the updated content object is suitable for an interest, the node continues to generate interest for the next content object expressed in a corresponding network name (operation 354) and embed the updated consumer states and the associated state identifier in the generated interest (operation 356). If the updated content object is not suitable for an interest, the node determines the difference between the updated and the previous consumer states (operation 368) and generates an interest for a content object expressed in a corresponding network name (operation 370). The node embeds the previous state identifier and the difference between the consumer states in the generated interest (operation 372) and forwards the interest based on the network name (operation 358). In some embodiments, the previous state identifier is embedded in the interest as a network name of the state identifier.

Figure 3C:
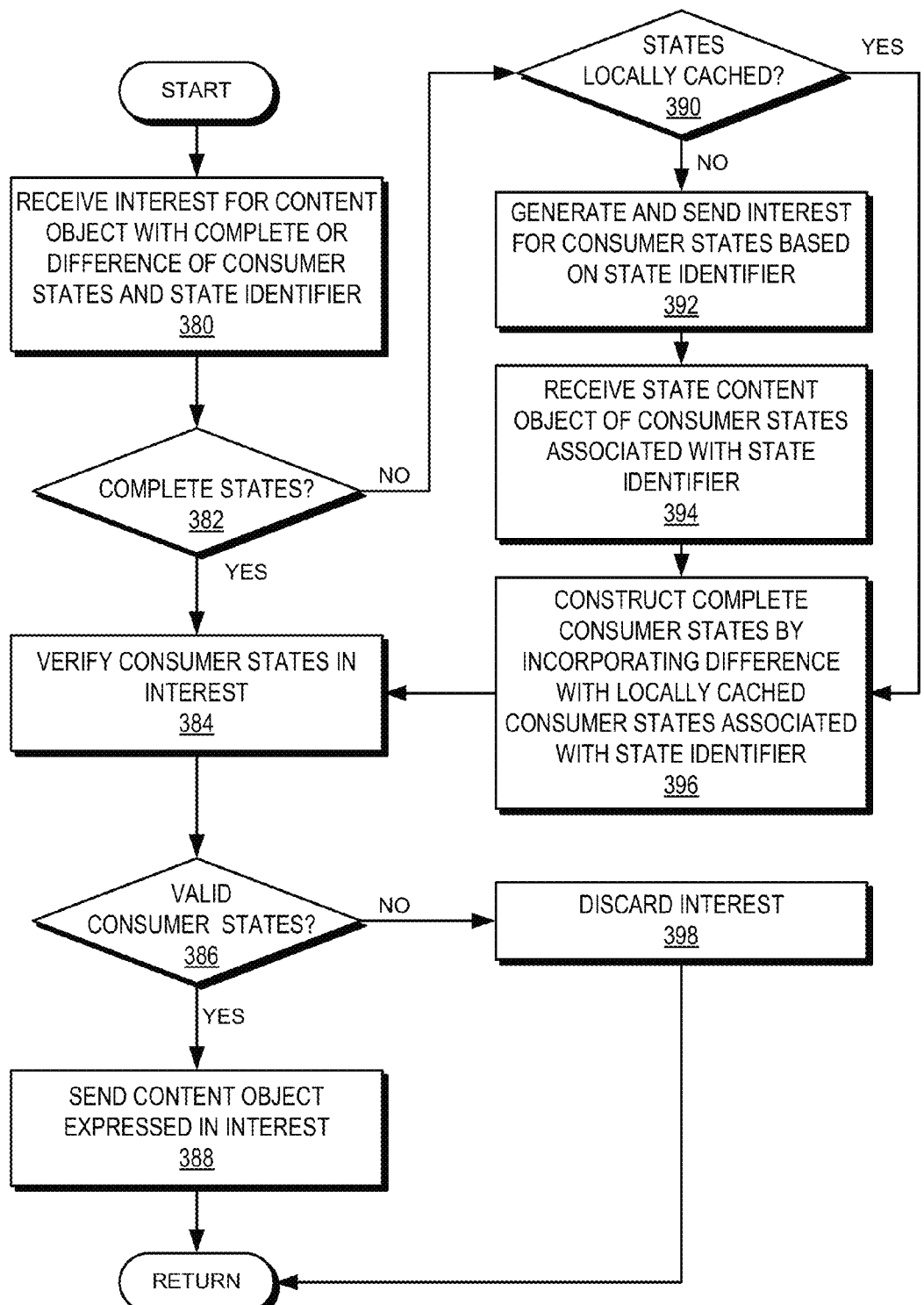
FIG. 3C presents a flowchart illustrating the process of a producer node responding to interests with integrated consumer states and associated state identifiers, in accordance with an embodiment of the present invention.

FIG. 3C presents a flowchart illustrating the process of a producer node responding to interests with integrated consumer states and associated state identifiers, in accordance with an embodiment of the present invention. During operation, the node receives an interest for a content object with complete or difference of consumer states and a state identifier (operation 380). In some embodiments, the state identifier is embedded in the interest as a network name and the node obtains the state identifier from the name. The node checks whether received consumer states are complete consumer states (operation 382). If the received consumer states are not complete consumer states, the node checks whether the consumer states are locally cached (i.e., have already been received) (operation 390). If the consumer states are not locally cached, the node generates and sends an interest for the consumer states based on the state identifier (operation 392), and receives the state content object of the consumer states associated with the state identifier (operation 394). In some embodiments, the node generates the interest for the consumer states based on a routable network name of the state identifier.

If the consumer states are locally cached (operation 390) or upon obtaining the consumer states (operation 394), the node constructs complete consumer states by incorporating the difference with the locally cached consumer states associated with the state identifier (operation 396), as described in conjunction with FIG. 3A. If the states are complete states (operation 382) or upon constructing the complete consumer states (operation 396), the node verifies the consumer states in the interest (operation 384). The node checks whether the consumer states are valid (operation 386), as described in conjunction with FIG. 2A. If the consumer states are valid, the node sends the content object expressed in interest (operation 388); otherwise, the node discards the interest (operation 398).

Integrated State Identifiers

Figure 4A:
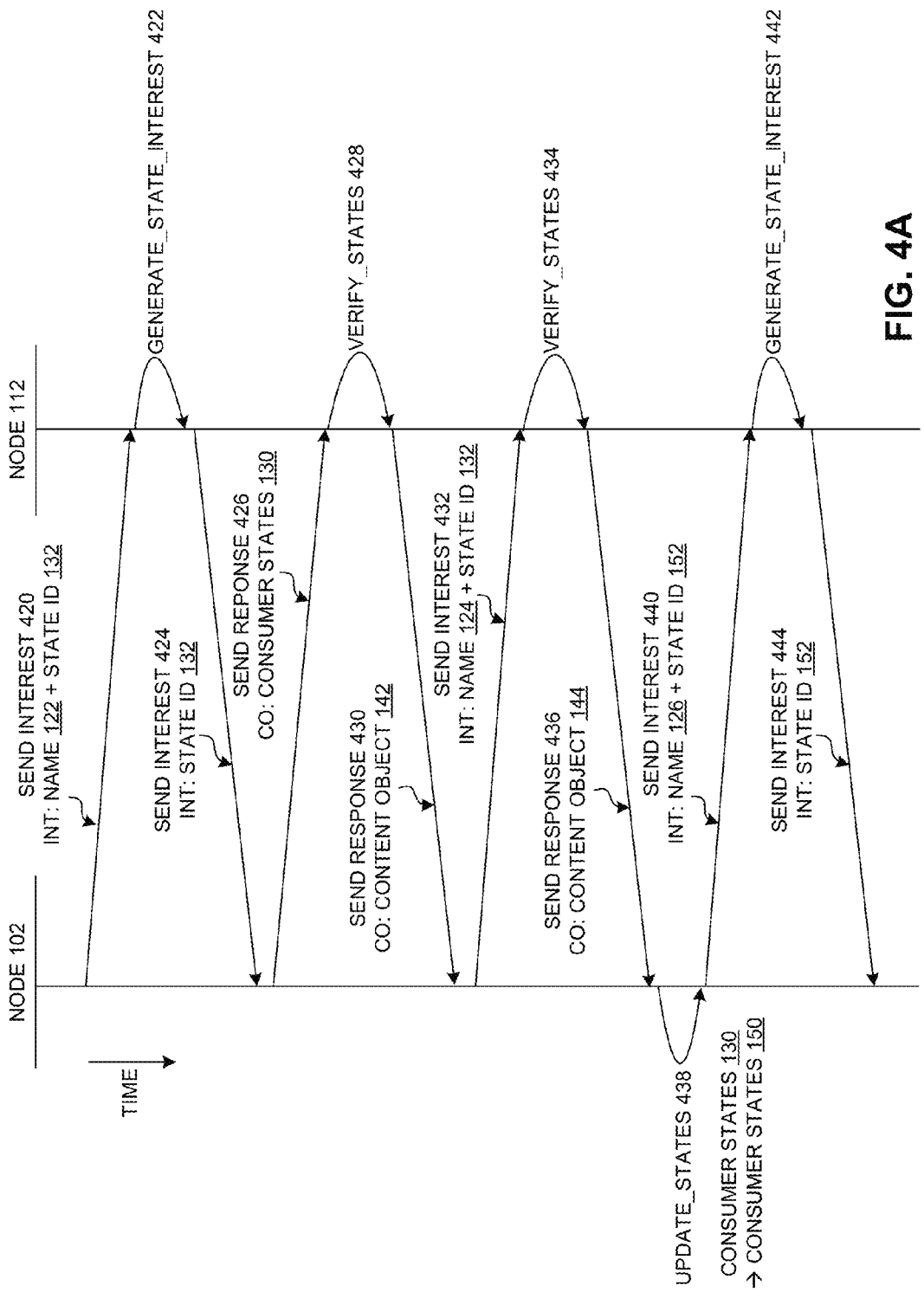
FIG. 4A illustrates an exemplary communication in a CCN with state-associated interest support based on state identifiers, in accordance with an embodiment of the present invention.

In some embodiments, a consumer node integrates a state identifier for consumer states into an interest. This state identifier can be part of the network name in the interest. FIG. 4A illustrates an exemplary communication in a CCN with state-associated interest support based on state identifiers, in accordance with an embodiment of the present invention. During operation, consumer node 102 in CCN 100 sends an initial interest 420 comprising a name 122 associated with content object 142 and state identifier 132 associated with consumer states 130. In some embodiments, state identifier 132 is embedded in interest 420 as a routable network name of state identifier 132. As interest 420 moves through CCN 100 from consumer node 102, producer node 112 receives interest 420 and, based on name 122 in interest 420, determines that producer node 112 hosts content object 142. Producer node 112 obtains state identifier 132 from interest 420 (e.g., from the network name of state identifier 132) and performs procedure generate_state_interest 422. In procedure 422, producer node 112 generates and sends an interest 424 for consumer states 130 based on state identifier 132. In some embodiments, interest 424 is based on the network name of state identifier 132. Consumer node 102 receives interest 424, and generates and sends a response message 426 comprising the state content object of consumer states 130.

Upon receiving response message 426, producer node 112 extracts the state content object of consumer states 130 (e.g., using a key of consumer node 102) and obtains consumer states 130. Producer node 112 performs procedure verify_states 428 to verify consumer states 130. For example, if interest 420 is for a video file (i.e., content object 142 is a video file), consumer states 130 can carry the username and password. Producer node 112 can locally cache consumer states 130. Procedure 428 then verifies whether the username and password correspond to a valid subscriber of content object 142. In other words, the verification procedure can include the caching of consumer states. In some embodiments, the verification procedure includes authentication of the consumer node.

Upon verification, producer node 112 sends a response message 430 comprising content object 142. Consumer node 102 then sends another interest 432 for the next content object 144 (which can be another video file) comprising a name 124 associated with content object 144 and state identifier 132. In some embodiments, state identifier 132 is embedded in interest 432 as the network name of state identifier 132. Since provider node 112 has already cached consumer states 130 associated with state identifier 132, provider node 112 performs procedure verify_states 434 to verify consumer states 130. Upon verification, producer node 112 sends a response message 436 comprising content object 144.

Suppose that consumer node 102 performs procedure update_states 438 and updates consumer states 130 (e.g., updates the password) to consumer states 150, as described in conjunction with FIG. 1. Then, consumer node 102 sends another interest 440 comprising a name 126 associated with content object 146 (which can be another video file) and state identifier 152. In some embodiments, state identifier 152 is embedded in interest 440 as a routable network name of state identifier 152. Producer node 112 receives interest 440 and obtains state identifier 152 from interest 440 (e.g., from the network name of state identifier 152). Producer node 112 determines that consumer states 150 associated with state identifier 152 are not locally cached. Producer node 112 then performs procedure generate_state_interest 442. In procedure 442, producer node 112 generates an interest 444 for consumer states 150 based on state identifier 152. In some embodiments, interest 442 is based on the network name of state identifier 152. In this way, if producer node 112 has the consumer states locally cached, producer node 112 does not need to generate an interest for the consumer states. However, if producer node 112 does not have the consumer states locally cached, producer node 112 generates an interest for the consumer states, obtains and verifies the consumer states, and locally caches the consumer states.

Figure 4B:
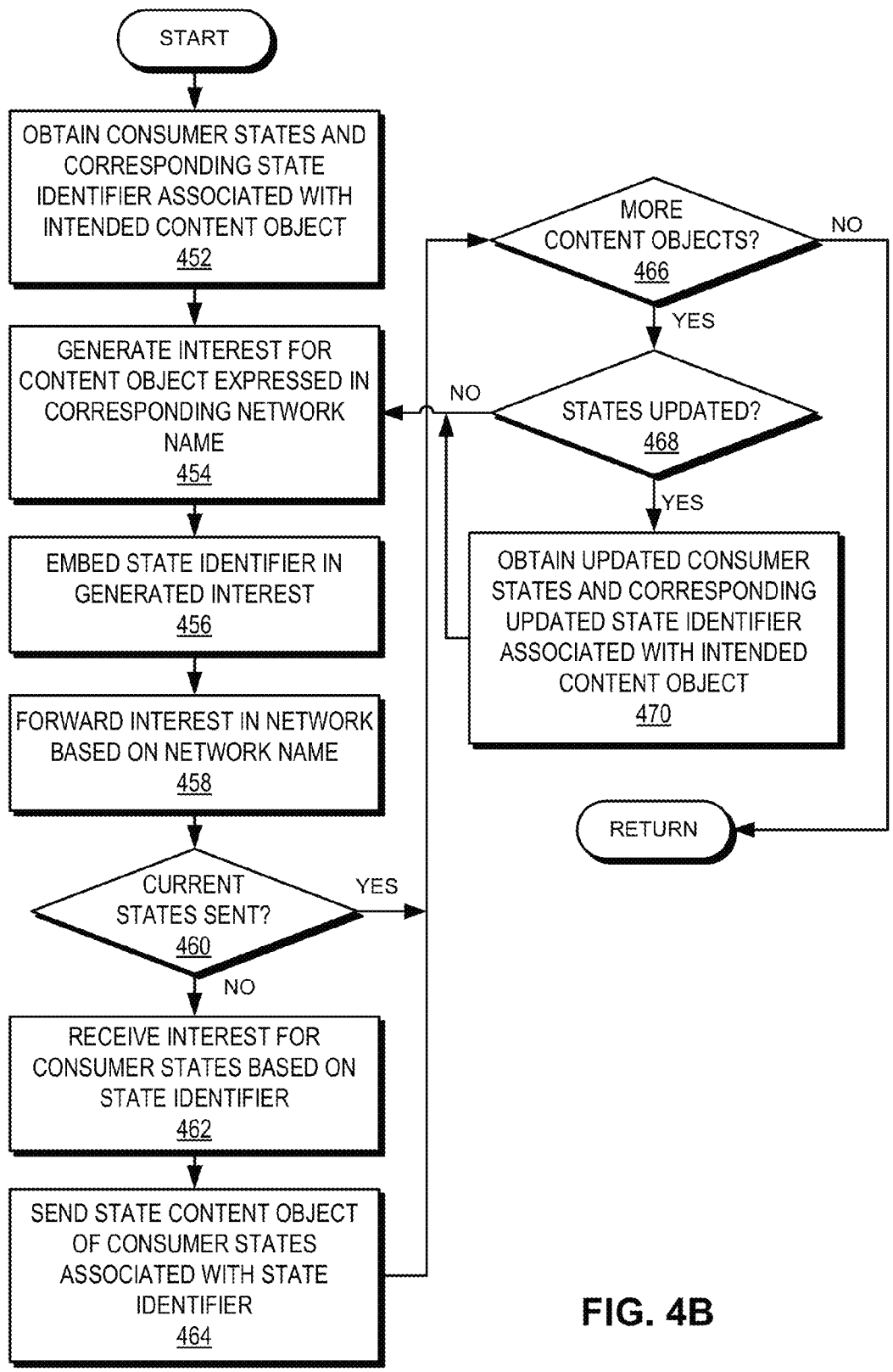
FIG. 4B presents a flowchart illustrating the process of a consumer node expressing interests with state identifiers, in accordance with an embodiment of the present invention.

FIG. 4B presents a flowchart illustrating the process of a consumer node expressing interests with state identifiers, in accordance with an embodiment of the present invention. During operation, the node obtains consumer states and a corresponding state identifier associated with an intended content object (operation 452). The node generates an interest for the content object expressed in a corresponding network name (operation 454) and embeds the state identifier in the generated interest (operation 456). In some embodiments, the node includes the network name of the state identifier in the network name in the interest. The node forwards the interest based on the network name (operation 458).

The node checks whether the current consumer states have been sent (operation 460). If not, the node receives an interest for consumer states based on the network name of the state identifier (operation 462) and sends the state content object of the consumer states associated with the state identifier (operation 464). If the current consumer states have been sent (operation 460 or 464), the node checks whether more content objects are associated with the obtained consumer states (operation 466). If more content objects are associated with the consumer states, the node checks whether the consumer states have been updated (operation 468), as described in conjunction with FIG. 4A. If the consumer states have not been updated, the node continues to generate interest for the next content object expressed in corresponding network name (operation 454) and embed the state identifier in the generated interest (operation 456). If the consumer states have been updated, the node obtains updated consumer states, which is also associated with the next content object, and the corresponding updated state identifier (operation 470). The node then generates an interest for the next content object expressed in corresponding network name (operation 454) and embed the state identifier of the updated consumer states in the generated interest (operation 456).

Figure 4C:
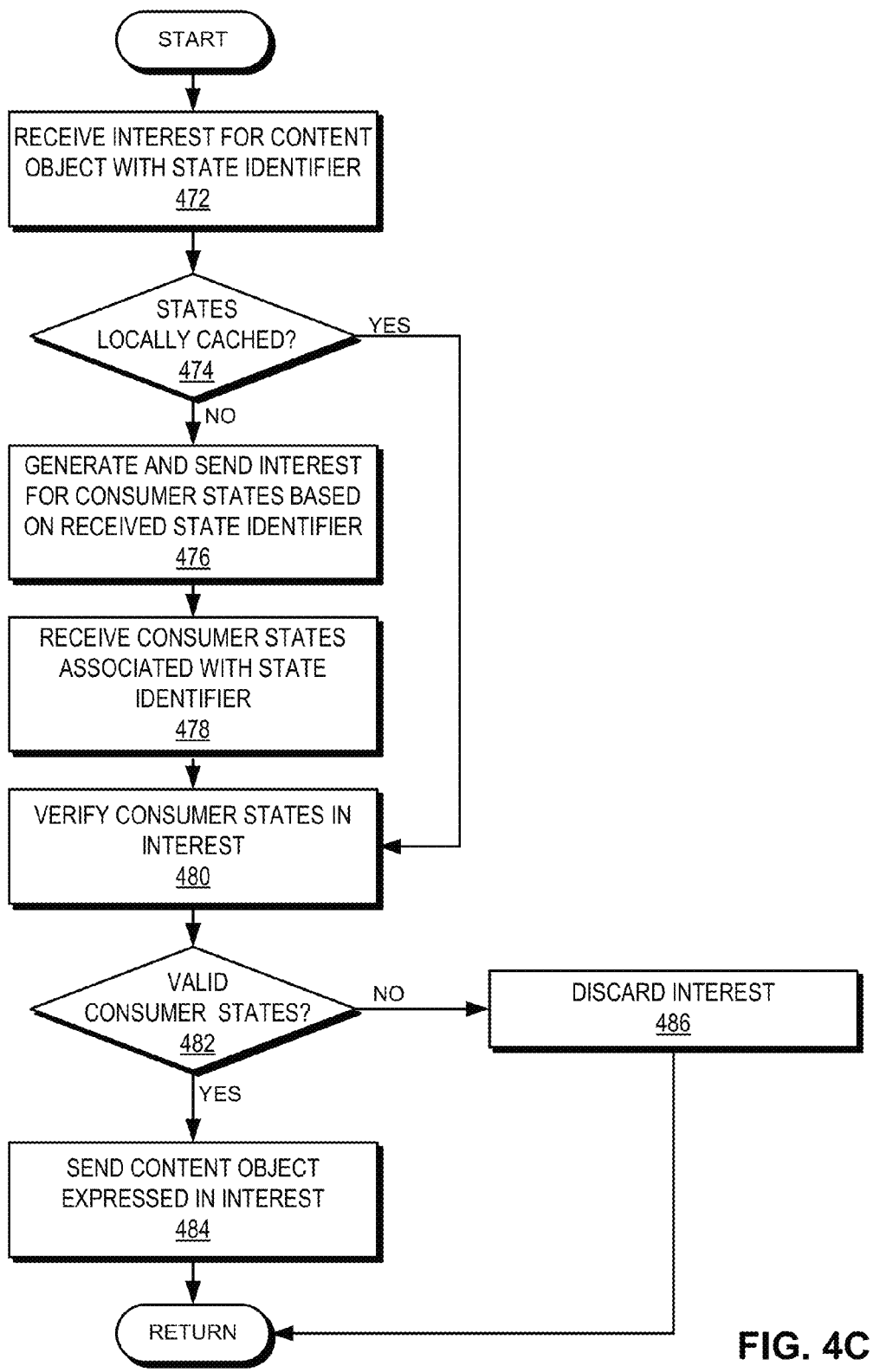
FIG. 4C presents a flowchart illustrating the process of a producer node responding to interests with state identifiers, in accordance with an embodiment of the present invention.

FIG. 4C presents a flowchart illustrating the process of a producer node responding to interests with state identifiers, in accordance with an embodiment of the present invention. During operation, the node receives an interest for a content object with a state identifier (operation 472). In some embodiments, the state identifier is embedded in the interest as a network name and the node obtains the state identifier from the name. The node checks whether the consumer states associated with the state identifier are locally cached (i.e., have already been received) (operation 474). If not, the node generates and sends an interest for consumer states based on the received state identifier (operation 476), and receives the state content object of the consumer states associated with the state identifier (operation 478). In some embodiments, the node generates the interest for the consumer states based on a routable network name of the state identifier.

If the consumer states are locally cached (operation 474) or upon obtaining the consumer states (operation 478), the node verifies the consumer states in the interest (operation 480). The node checks whether the consumer states are valid (operation 482), as described in conjunction with FIG. 4A. If the consumer states are valid, the node sends the content object expressed in the interest (operation 484). Otherwise, the node discards the interest (operation 486).

Integrated State Identifiers and State Differences

Figure 5A:
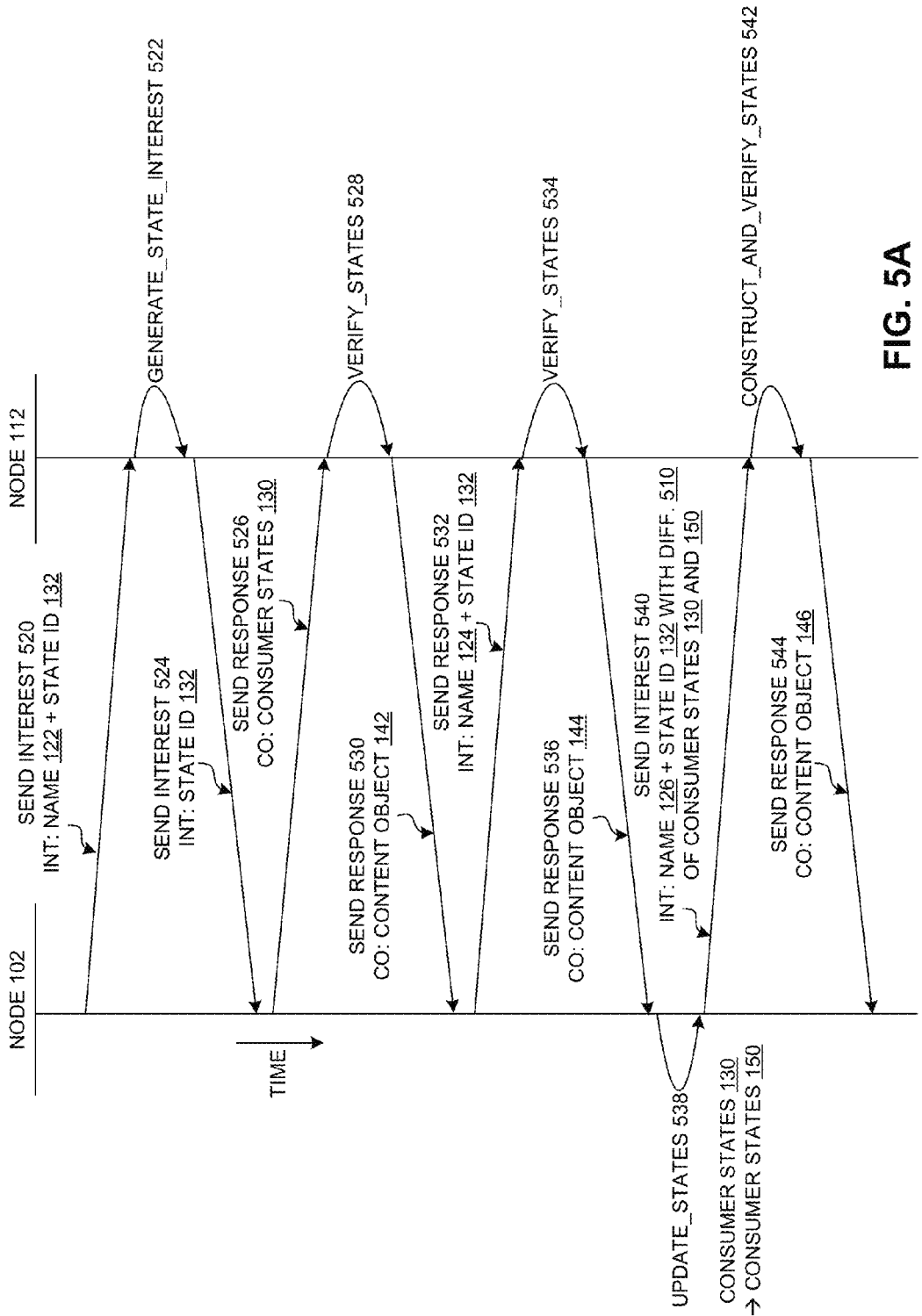
FIG. 5A illustrates an exemplary communication in a CCN with state-associated interest support based on state identifiers and associated state differences, in accordance with an embodiment of the present invention.

In some embodiments, a consumer node integrates a state identifier for consumer states into an interest. This state identifier can be part of the network name in the interest. FIG. 5A illustrates an exemplary communication in a CCN with state-associated interest support based on state identifiers and associated state differences, in accordance with an embodiment of the present invention. During operation, consumer node 102 in CCN 100 sends an initial interest 520 comprising a name 122 associated with content object 142 and state identifier 132 associated with consumer states 130. In some embodiments, state identifier 132 is embedded in interest 520 as a routable network name of state identifier 132.

As interest 520 moves through CCN 100 from consumer node 102, producer node 112 receives interest 520 and, based on name 122 in interest 520, determines that producer node 112 hosts content object 142. In some embodiments, producer node 112 derives state identifier 132 from its network name embedded in interest 520. Producer node 112 extracts state identifier 132 from interest 520 and performs procedure generate_state_interest 522. In procedure 522, producer node 112 generates and sends an interest 524 for consumer states 130 based on state identifier 132. In some embodiments, state identifier 132 can be a network name in CCN 100. Consumer node 102 receives interest 524 and generates and sends a response message 526 comprising consumer states 130.

Upon receiving response message 526, producer node 112 extracts consumer states 130 and performs procedure verify_states 528 to verify consumer states 130. For example, if interest 520 is for a video file (i.e., content object 142 is a video file), consumer states 130 can carry the username and password. Producer node 112 can locally cache consumer states 130. Procedure 528 then verifies whether the username and password correspond to a valid subscriber of content object 142. In other words, the verification procedure can include the caching of consumer states. In some embodiments, the verification procedure includes authentication of the consumer node.

Upon verification, producer node 112 sends a response message 530 comprising content object 142. Consumer node 102 then sends another interest 532 for the next content object 144 (which can be another video file) comprising a name 124 associated with content object 144 and state identifier 132. In some embodiments, state identifier 132 is embedded in interest 520 as a network name of state identifier 132. Since provider node 112 has already cached consumer states 130 associated with state identifier 132, provider node 112 performs procedure verify_states 534 to verify consumer states 130. Upon verification, producer node 112 sends a response message 536 comprising content object 144.

Suppose that consumer node 102 performs procedure update_states 538 and updates consumer states 130 (e.g., updates the password) to consumer states 150, as described in conjunction with FIG. 1. When consumer node 102 sends another interest 540 for another content object 146 (which can be another video file) associated with the same consumer states, consumer node 102 includes a name 126, state identifier 132 of previous consumer states 130, and a difference 510 between consumer states 130 and 150 in interest 540. In some embodiments, consumer node 102 assigns an identifier to difference 510 and includes the identifier of the difference in interest 540. State identifier 132 can be embedded in interest 540 as the network name of state identifier 132. Difference 510 can be small compared to consumer states 150 and can be more suitable to fit in interest 540 than consumer states 150.

Producer node 112 receives interest 540 and determines that producer node 112 hosts content object 146. Producer node 112 obtains state identifier 132 and difference 510, and determines that consumer states 130 are locally cached and have been updated at consumer node 102. Producer node 112 incorporates difference 510 into cached consumer states 130 to perform procedure construct_and_verify_states 542 to construct and verify consumer states 150. Upon verification of consumer states 150, producer node 112 sends a response message 544 comprising content object 146.

Figure 5B:
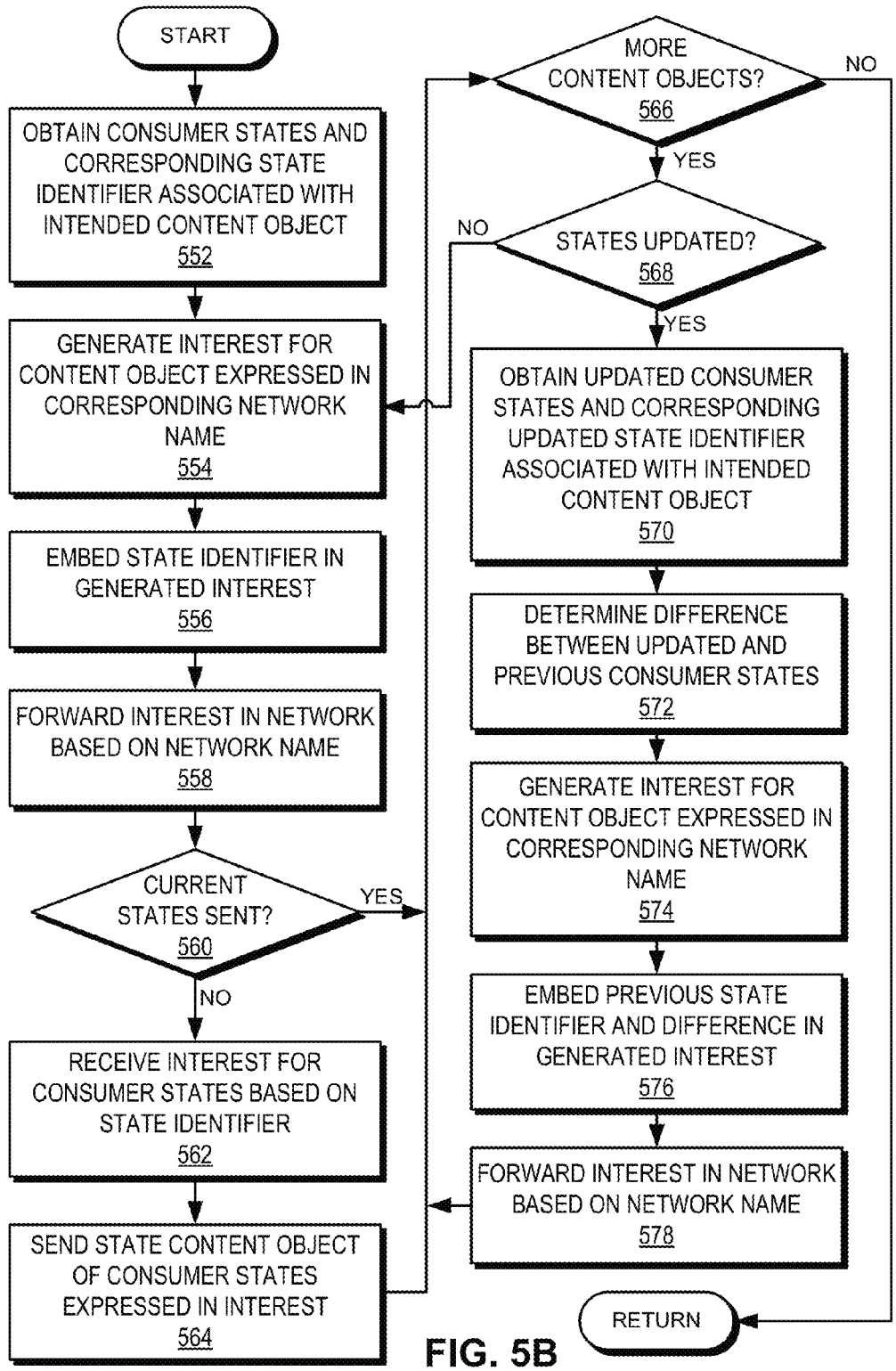
FIG. 5B presents a flowchart illustrating the process of a consumer node expressing interests with state identifiers and associated state differences, in accordance with an embodiment of the present invention.

FIG. 5B presents a flowchart illustrating the process of a consumer node expressing interests with state identifiers and associated state differences, in accordance with an embodiment of the present invention. During operation, the node obtains the consumer states and a corresponding state identifier associated with an intended content object (operation 552). The node generates an interest for the content object expressed in a corresponding network name (operation 554) and embeds the state identifier in the generated interest (operation 556). In some embodiments, the state identifier is embedded in the interest as a routable network name of the state identifier. The node forwards the interest based on the network name (operation 558).

The node checks whether the current consumer states have been sent (operation 560). If not, the node receives an interest for consumer states based on the state identifier (operation 562). In some embodiments, the interest is generated based on the network name of the state identifier. Upon receiving the interest, the node sends the state content object of the consumer states associated with the state identifier (operation 564). If the current consumer states have been sent (operation 560 or 564), the node checks whether more content objects are associated with the obtained consumer states (operation 566). If more content objects are associated with the consumer states, the node checks whether the consumer states have been updated (operation 568), as described in conjunction with FIG. 5A.

If the consumer states have not been updated, the node continues to generate interest for the next content object expressed in the corresponding network name (operation 554) and embed the state identifier in the generated interest (operation 556). If the consumer states have been updated, the node obtains the updated consumer states, which is also associated with the next content object, and the corresponding updated state identifier (operation 570). The node determines the difference between the updated and the previous consumer states (operation 572). The node generates an interest for the content object expressed in the corresponding network name (operation 574) and embeds the previous state identifier and the difference between the consumer states in the generated interest (operation 576). In some embodiments, the state identifier is embedded in the interest as a network name of the state identifier. The node forwards the interest based on the network name (operation 578) and continues to check whether more content objects are associated with the obtained consumer states (operation 566).

Figure 5C:
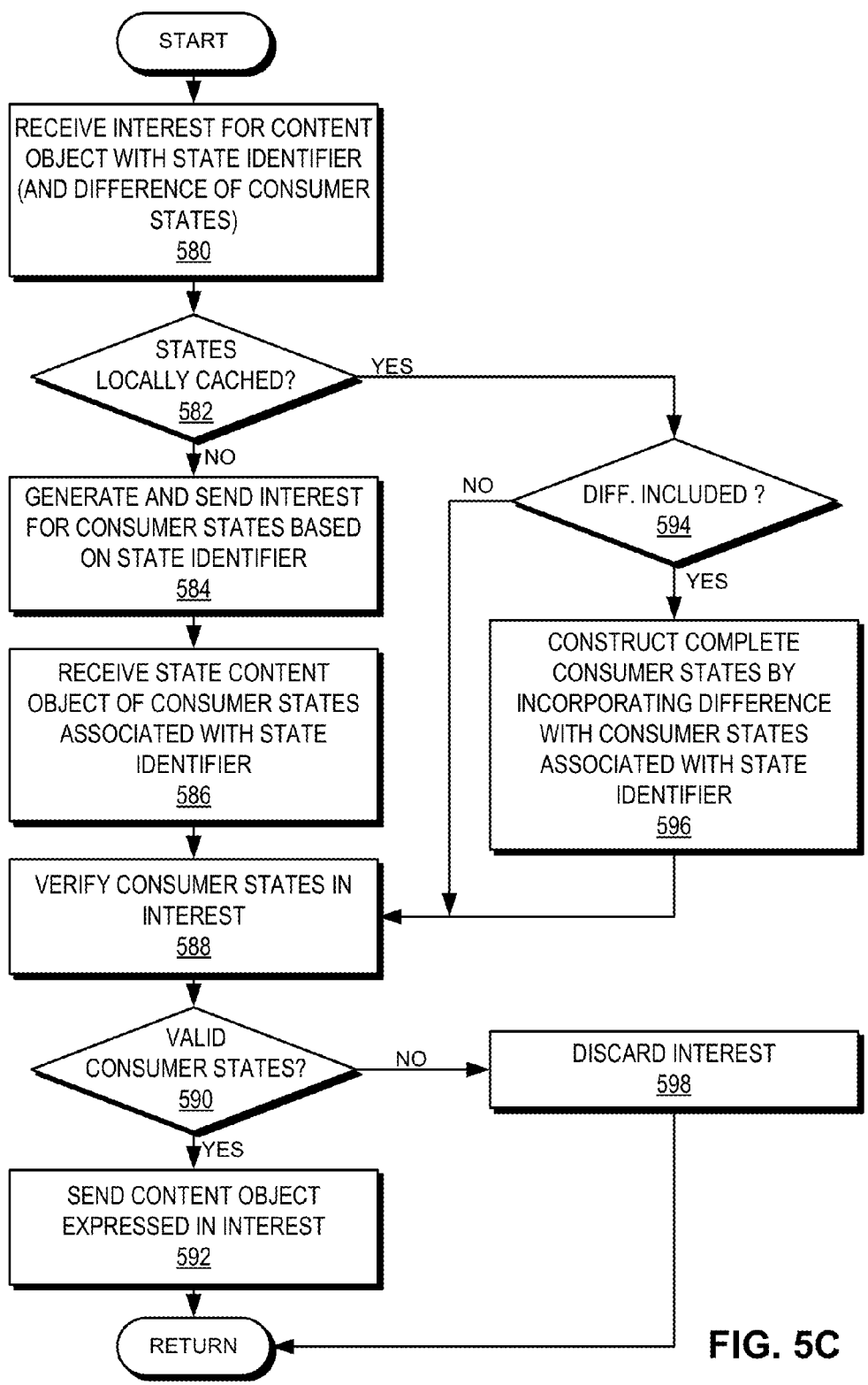
FIG. 5C presents a flowchart illustrating the process of a producer node responding to interests with state identifiers and associated state differences, in accordance with an embodiment of the present invention.

FIG. 5C presents a flowchart illustrating the process of a producer node responding to interests with state identifiers and associated state differences, in accordance with an embodiment of the present invention. During operation, the node receives an interest for a content object with a state identifier (operation 580). If the consumer states of the corresponding consumer node have been updated, the interest can also include the difference between the updated and the previous consumer states (operation 580), as described in conjunction with FIG. 5A. In some embodiments, the state identifier is embedded in the interest as a network name and the node obtains the state identifier from the name. The node then checks whether the consumer states associated with the state identifier are locally cached (i.e., have already been received) (operation 582). If not, the node generates and sends an interest for consumer states based on the received state identifier (operation 584). In some embodiments, the interest is generated based on the network name of the state identifier. The node receives the state content object of the consumer states associated with the state identifier (operation 586).

If the consumer states are locally cached (operation 582), the node checks whether a difference is included in the interest (operation 594). If so, the node constructs complete consumer states by incorporating the difference with the locally cached consumer states associated with the state identifier (operation 596), as described in conjunction with FIG. 5A. Upon obtaining the consumer states (operation 586) or constructing the complete consumer states (operation 596), the node verifies the consumer states in the interest (operation 588). The node checks whether the consumer states are valid (operation 590), as described in conjunction with FIG. 5A. If the consumer states are valid, the node sends the content object expressed in the interest (operation 592). Otherwise, the node discards the interest (operation 598).

Determining State Association

Figure 6:
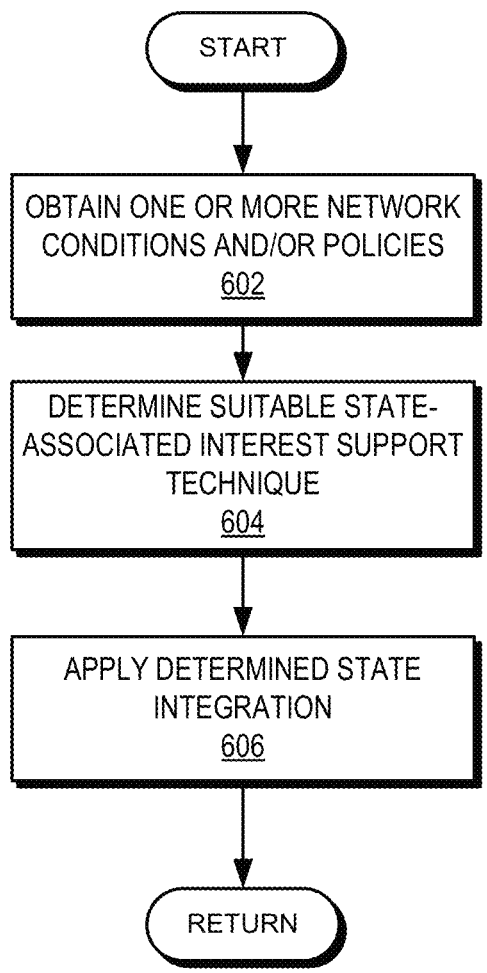
FIG. 6 presents a flowchart illustrating the process of selecting suitable state-associated interest support technique, in accordance with an embodiment of the present invention.

FIG. 6 presents a flowchart illustrating the process of selecting suitable state-associated interest support technique, in accordance with an embodiment of the present invention. During operation, the node obtains one or more network conditions and/or policies (operation 602). The node determines a suitable state-associated interest support technique (operation 604) and applies the determined state integration (operation 606).

Depending on the goals, a consumer node can use different techniques to decide what type of information in consumer states to include in the interest. Examples of the goals include, but are not limited to, minimizing latency, minimizing transmitted data, minimizing fragmentation of interests, and any (weighted) combination thereof. Depending on the probability that the producer node has access to the previous consumer states and the optimization goals, the consumer node has to select which information to include in the interest. It should be noted that making a correct prediction about whether the server has access to the consumer states can increase the efficiency. Hence, additional knowledge regarding the producer node can be included to increase the accuracy of the prediction.

To be able to determine differences for all possible types of data, the VCDIFF Generic Differencing and Compression Data Format can be used. This data format is described in Internet Engineering Task Force (IETF) Request for Comments (RFC) 3284, titled "The VCDIFF Generic Differencing and Compression Data Format," the disclosure of which is incorporated by reference herein. It should be noted that it is possible to decrease the size of the difference by increasing processing time. Since the VCDIFF format is independent of the encoder of the difference, VCDIFF allows different clients to select different tradeoffs, wherein the decoder always remains the same.

Apparatus and Computer System

Figure 7:
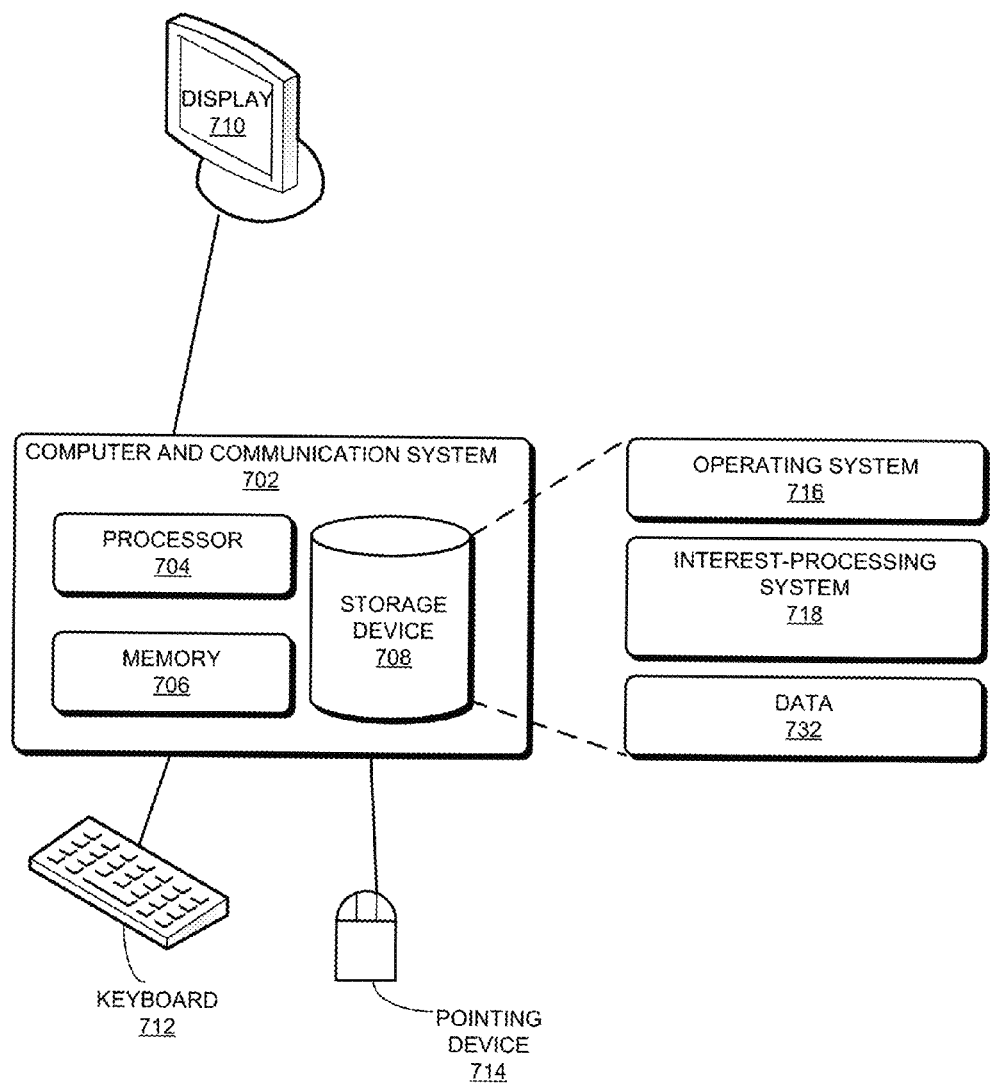
FIG. 7 illustrates an exemplary computer and communication system facilitating state-associated interest support in a CCN, in accordance with an embodiment of the present invention.

FIG. 7 illustrates an exemplary computer and communication system facilitating state-associated interest support in a CCN, in accordance with an embodiment of the present invention. Computer and communication system 702 includes a processor 704, a memory 706, and a storage device 708. Memory 706 can include a volatile memory (e.g., RAM) that serves as a managed memory, and can be used to store one or more memory pools. Furthermore, computer and communication system 702 can be coupled to a display device 710, a keyboard 712, and a pointing device 714. Storage device 708 can store an operating system 716, an interest-processing system 718, and data 732.

Interest-processing system 718 can include instructions, which when executed by computer and communication system 702, can cause computer and communication system 702 to perform methods and/or processes described in this disclosure. Specifically, interest-processing system 718 can facilitate associating consumer states with interests in a CCN. In some embodiments, interest-processing system 718 can be executed on a plurality of computer and communication systems, which are able to exchange data that describes the state of the operation associated with interest-processing system 718.

In summary, embodiments of the present invention provide a computer system and a method that facilitates associating consumer states with interests in a CCN. During operation, the system generates an interest for a content object comprising a name of the content object in a remote node. The name in the interest is location independent and uniquely identifies the content object in the CCN. The interest is routed in the CCN based on the name. The system also associates the consumer states, which are associated with the content object, with the interest.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:
generating, by a computing device, an interest which is a request for a content object, wherein the interest includes a name for the requested content object, and wherein the name is a hierarchically structured variable length identifier which comprises contiguous name components ordered from a most general level to a most specific level;

generating consumer states, wherein the consumer states are associated with the requested content object;

generating a state identifier for the consumer states;

calculating a difference between updated consumer states and the consumer states;

integrating in the interest the difference and one or more of a state identifier of the consumer states, an identifier of the new consumer states, and an identifier of the difference;

transmitting the interest to a content-hosting device, wherein transmitting the interest causes the content-hosting device to:

in response to determining that the updated consumer states are not stored in a local cache of the content-hosting device, extract the difference and one or more of a state identifier of the consumer states, an identifier of the new consumer states, and an identifier of the difference from the interest, identify the consumer states from the local cache based on the state identifier of the consumer states, update the consumer states to the updated consumer states without obtaining the updated consumer state from the computing device, thereby saving roundtrip time; and in response to determining that the updated consumer states are stored in the local cache, avoid extracting the difference and one or more of a state identifier of the consumer states, an identifier of the new consumer states, and an identifier of the difference from the interest, thereby eliminating time spent for the content-hosting device to extract the difference and one or more of a state identifier of the consumer states, an identifier of the new consumer states, and an identifier of the difference in the interest.

2. The method of claim 1, further comprising:

creating a state content object of the consumer states; and associating the state identifier with the state content object.

3. The method of claim 2, wherein associating the state identifier with the state content object further comprises assigning a network name to the state content object based on the consumer state identifier.

4. The method of claim 3, wherein integrating the consumer states into the interest comprises one or more of:

embedding the consumer states in the interest;

embedding the state content object in the interest;

encoding the state identifier in the interest;

encoding the name of the state content object in the interest;

encoding the state identifier in the name for the content object in the interest; and encoding the state content object in the name for the content object in the interest.

5. The method of claim 1, further comprising caching the consumer states.

6. A non-transitory computer-readable storage medium storing instructions that when executed by a computer causes the computer to perform a method, the method comprising:

generating, by a computing device, an interest which is a request for a content object, wherein the interest includes a name for the requested content object, and wherein the name is a hierarchically structured variable length identifier which comprises contiguous name components ordered from a most general level to a most specific level;

generating consumer states, wherein the consumer states are associated with the requested content object;

generating a state identifier for the consumer states;

calculating a difference between updated consumer states and the consumer states;

integrating in the interest the difference and one or more of a state identifier of the consumer states, an identifier of the new consumer states, and an identifier of the difference;

transmitting the interest to a content-hosting device, wherein transmitting the interest causes the content-hosting device to:

in response to determining that the updated consumer states are not stored in a local cache of the content-hosting device, extract the difference and one or more of a state identifier of the consumer states, an identifier of the new consumer states, and an identifier of the difference from the interest, identify the consumer states from the local cache based on the state identifier of the consumer states, update the consumer states to the updated consumer states without obtaining the updated consumer state from the computing device, thereby saving roundtrip time; and in response to determining that the updated consumer states are stored in the local cache, avoid extracting the difference and one or more of a state identifier of the consumer states, an identifier of the new consumer states, and an identifier of the difference from the interest, thereby eliminating time spent for the content-hosting device to extract the difference and one or more of a state identifier of the consumer states, an identifier of the new consumer states, and an identifier of the difference in the interest.

7. The method of claim 6, further comprising:

creating a state content object of the consumer states; and associating the state identifier with the state content object.

8. The storage medium of claim 7, wherein associating the state identifier with the state content object further comprises assigning a network name to the state content object based on the consumer state identifier.

9. The storage medium of claim 8, wherein integrating the consumer states into the interest comprises one or more of:

embedding the consumer states in the interest;

embedding the state content object in the interest;

encoding the state identifier in the interest;

encoding the name of the state content object in the interest;

encoding the state identifier in the name for the interest; and encoding the state content object in the name for the interest.

10. The storage medium of claim 6, wherein the method further comprises caching the consumer states.

11. A computer system comprising:

a processor;

a storage device coupled to the processor and storing instructions that when executed by the a computer cause the computer to perform a method, the method comprising:

generating, by a computing device, an interest which is a request for a content object, wherein the interest includes a name for the requested content object, and wherein the name is a hierarchically structured variable length identifier which comprises contiguous name components ordered from a most general level to a most specific level;

generating consumer states, wherein the consumer states are associated with the requested content object;

generating a state identifier for the consumer states;

calculating a difference between updated consumer states and the consumer states;

integrating in the interest the difference and one or more of a state identifier of the consumer states, an identifier of the new consumer states, and an identifier of the difference;

transmitting the interest to a content-hosting device, wherein transmitting the interest causes the content-hosting device to:

in response to determining that the updated consumer states are not stored in a local cache of the content-hosting device, extract the difference and one or more of a state identifier of the consumer states, an identifier of the new consumer states, and an identifier of the difference from the interest, identify the consumer states from the local cache based on the state identifier of the consumer states, update the consumer states to the updated consumer states without obtaining the updated consumer state from the computing device, thereby saving roundtrip time; and in response to determining that the updated consumer states are stored in the local cache, avoid extracting the difference and one or more of a state identifier of the consumer states, an identifier of the new consumer states, and an identifier of the difference from the interest, thereby eliminating time spent for the content-hosting device to extract the difference and one or more of a state identifier of the consumer states, an identifier of the new consumer states, and an identifier of the difference in the interest.

12. The method of claim 11, further comprising:

creating a state content object of the consumer states; and associating the state identifier with the state content object.

13. The computer system of claim 12, wherein associating the state identifier with the state content object further comprises assigning a network name to the state content object based on the consumer state identifier.

14. The computer system of claim 13, wherein integrating the consumer states into the interest comprises one or more of:

embedding the consumer states in the interest;
embedding the state content object in the interest;
encoding the state identifier in the interest;
encoding the name of the state content object in the interest;
encoding the state identifier in the name for the interest; and
encoding the state content object in the name for the interest.

15. The computer system of claim 11, wherein the method further comprises caching the consumer states.

* * * * *